United States Patent [19]

Koch

[11] 4,437,431

[45] Mar. 20, 1984

[54] METHOD AND APPARATUS FOR DIVERSION OF DOWNSTREAM MIGRATING ANADROMOUS FISH

[76] Inventor: David L. Koch, 2520 Saggitarius Dr., Reno, Nev. 89509

[21] Appl. No.: 318,992

[22] Filed: Nov. 6, 1981

[51] Int. Cl.³ .............................................. E02B 8/08
[52] U.S. Cl. .......................................... 119/3; 405/81
[58] Field of Search ........................ 119/3; 405/81, 83

[56] References Cited

U.S. PATENT DOCUMENTS

| | | | |
|---|---|---|---|
| 1,722,596 | 7/1929 | Ross | 405/83 |
| 2,174,657 | 10/1939 | Helsel | 405/83 |
| 2,683,969 | 7/1954 | Mugnier | 405/83 |
| 2,826,897 | 3/1958 | Vinsonhaler et al. | 119/3 X |
| 3,772,891 | 11/1973 | Raistakka | 119/3 X |
| 3,820,342 | 6/1974 | Stipanov | 405/83 |
| 3,938,340 | 2/1976 | Downs | 405/83 |

Primary Examiner—Robert P. Swiatek
Attorney, Agent, or Firm—Herbert C. Schulze

[57] ABSTRACT

This is a method, and apparatus for performing the method, by which artificial stream conditions are generated within the forebay of dams used for hydroelectric facilities. The method includes the introduction into the reservoir at the appropriate depth of an artificial stream condition to attract downstream migrating fish and to then divert them into a generally nonvisible (at its inception) conduit with a gradually reducing interior section until such time as the fish are brought into an increased stream flow from which they cannot retreat. The fish are then carried by conduit around or in other manner bypassing the dam and the electrical generating turbines or the like to a point downstream from the dam where they are released into the stream. The system is characterized by jets forming an appropriate artificial stream, an in-line high volume fish pump, a transparent collector area through which the artificially induced stream flows, and a gradually reducing interior section resulting in increased velocity of the artificial stream to the point where the downstream migrating fish cannot escape. Also incorporated are provisions for eliminating predators from the stream.

20 Claims, 6 Drawing Figures

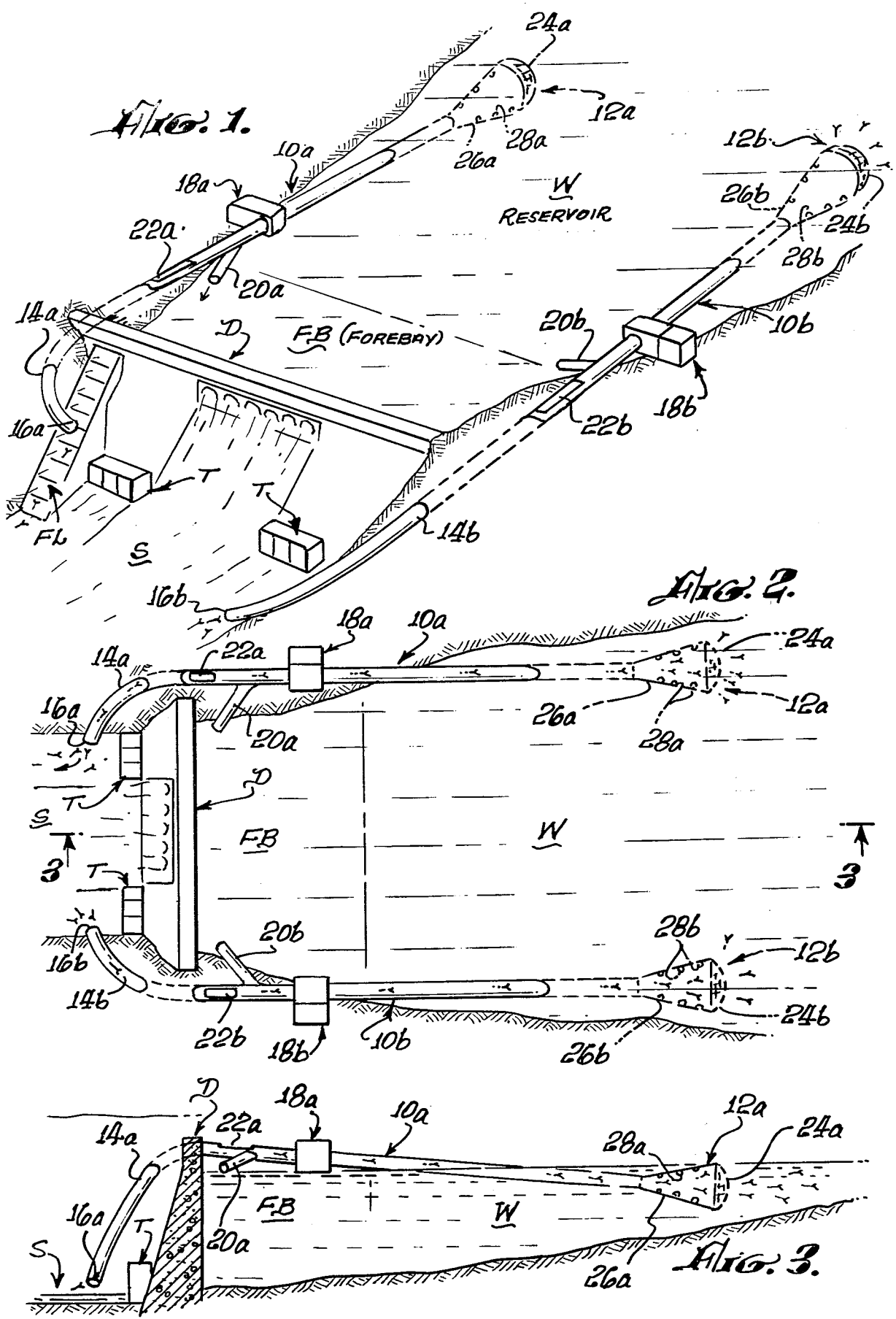

METHOD AND APPARATUS FOR DIVERSION OF DOWNSTREAM MIGRATING ANADROMOUS FISH

BACKGROUND OF THE INVENTION

1. Field of the invention:

This invention is in the general field of collecting downstream, migrating fish and diverting them from dangerous conditions such as hydroelectric turbines and the like through which they might otherwise pass. The invention is further directed to a method and apparatus of simulating the natural stream conditions to which the fish are accustomed and diverting them through the simulated natural stream condition around the hydroelectric generating facilities. The method and apparatus are further characterized by utilizing features which attract the natural migrating tendencies of such fish and lure them into the desired channel for avoidance of the hydroelectric facilities as well as avoidance of predators. The method is more particularly directed to the creation of an artificial flow in the relatively quiet waters of a hydroelectric dam reservoir and thus simulating what would be the natural course for the fish to take together with channelling them gradually in a generally non-visible conduit to a smaller conduit wherein the flow is of such velocity that the fish cannot escape or return to the reservoir.

2. Description of the prior art:

In the past there have been attempts to form fish ladders for diverting fish both upstream and downstream, as well as to form conduits circling hydroelectric dams or the like for the intended purpose of attempting to protect fish from passing through hydroelectric turbines and the like where they are generally destroyed in large numbers. None of the heretofore devised or conceived methods have included the method of creating an artificial condition which in essence "deceives" the fish into believing they are following the natural stream from which they entered the hydroelectric dam reservoir. Further, such prior attempts have in no manner encompassed a variety of techniques to gradually change the condition which was interpreted by the fish as a natural condition to a forced traverse around the dam area and to discharge them into the natural stream below the dam. In this respect it can be considered that there is no prior art whatsoever relating to the present invention.

THE SUMMARY OF THE INVENTION

For many years I have studied the problem of downstream migrating fish particularly in the areas such as the Columbia River and the like. A very serious situation exists as to the ultimate continuance of certain fish species, primarily salmon, wherein these fish are hatched in the upper stream waters and ultimately migrate to the ocean. The same fish, then will ultimately return upstream for spawning and the ultimate hatching of the new young fish.

The problem which exists, primarily, is the problem of the downstream migrating fish passing through many successive hydroelectric generating areas.

The hydroelectric generating area commonly consists of a dam wherein a large quantity of the river water is stored temporarily and passes through hydroelectric generating turbines and the like in a manner which is known to those skilled in the art.

A fish passing through such equipment has little chance of survival and it has been shown that of the fish passing through or over such facilities approximately 10–30 percent will be killed either in passing through the actual electrical generating equipment, by large drops over dams or by reason of the fact that they will be stunned when they are discharged and become ready prey for predators of various types.

Thus, in passing through a series of hydroelectric generating areas the number of fish surviving to the ocean compared to those which started the journey will be reduced significantly.

Some efforts have been made to try to save the fish such as attempting to net and catch them, transport them into tank trucks or the like and bypass the dams. Also some efforts have been made to conduct conduits around the dam areas to allow the fish to pass. None of these methods have been successful since fish entering the forebay where the waters are relatively quiet except for the turbine pull will lose their sense of direction and travel which is governed by the natural stream flow.

Additionally, where attempts have been made to bypass the dams, large amounts of the water necessary for hydroelectric generation must of necessity be lost and thus the efficiency of the use of the water is greatly reduced.

I have studied completely the habits of the fish and their reaction in the still waters of the forebay. As a result of my studies I have now developed a system which takes into account the natural instincts, desires, and actions and reactions of these downstream migrating fish.

What I have done, is to create, within the reservoir above the forebay, an artificial stream. I have accomplished this by a series of carefully arranged water jets and a high volume fish pump together, and in combination with a transparent enlarged funnel like arrangement wherein the appearance to the fish is that of a stream flowing. The transparent funnel arrangement gradually reduces, and as this happens, the water flowing through it, increases in velocity. In a given period of time and distance, the velocity becomes great enough that the fish cannot turn back from the stream. At this point the fish may be funnelled into a non-transparent conduit or open channel adjacent to the reservoir if desired and carried rapidly in the current around the hydroelectric generating apparatus and may be discharged into the stream below the dam area.

I have also incorporated means to fend off such undesirable material from the water as logs or other debris and have incorporated means to separate and eliminate predators such as squaw fish and the like to which the small downstream migrating fish are ready prey.

By the use of the present system as incorporated within this application and is described in fruther detail below, I am able to save most of the downstream migrating fish which would otherwise be killed in passage through a series of hydroelectric generating dams.

It is an object of this invention to provide a means for deceiving downstream migrating fish entering the forebay of a hydroelectric generating dam area by the creation of an artificial stream within the reservoir into which the fish pass by natural instinct;

Another object of this invention is to provide such a system wherein the fish are unaware that they are being channelled into a conduit;

A further object of this invention is to channel these anadromous migrating fish into the tailrace area of hydroelectric generating dams;

Another object of this invention is to provide such a method and apparatus as herein set forth wherein foreign matter and predators may be removed from the artificial stream and the fish carrying conduit.

The foregoing and other objects and advantages of this invention will become apparent to those skilled in the art upon reading the description of a preferred embodiment in conjunction with the appended drawings.

BRIEF DESCRIPTION OF THE DRAWINGS

FIG. 1 is a simplified perspective illustrating the principles of my invention;

FIG. 2 is a simplified plan view of the device of FIG. 1;

FIG. 3 is a section as viewed on line 3—3 of FIG. 2;

DESCRIPTION OF A PREFERRED EMBODIMENT

Figure 4:
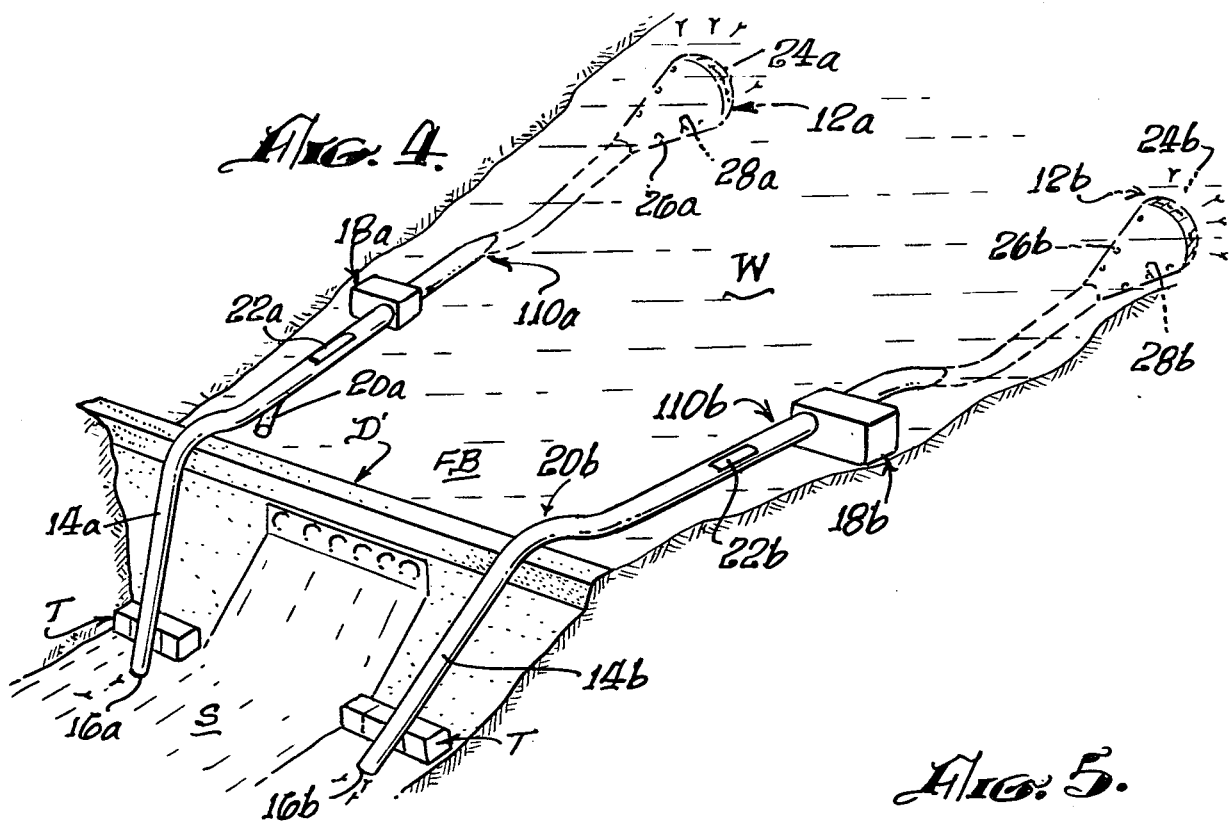
FIG. 4 is a simplified perspective similar to FIG. 1 but showing an alternate embodiment of the invention.
Figure 5:
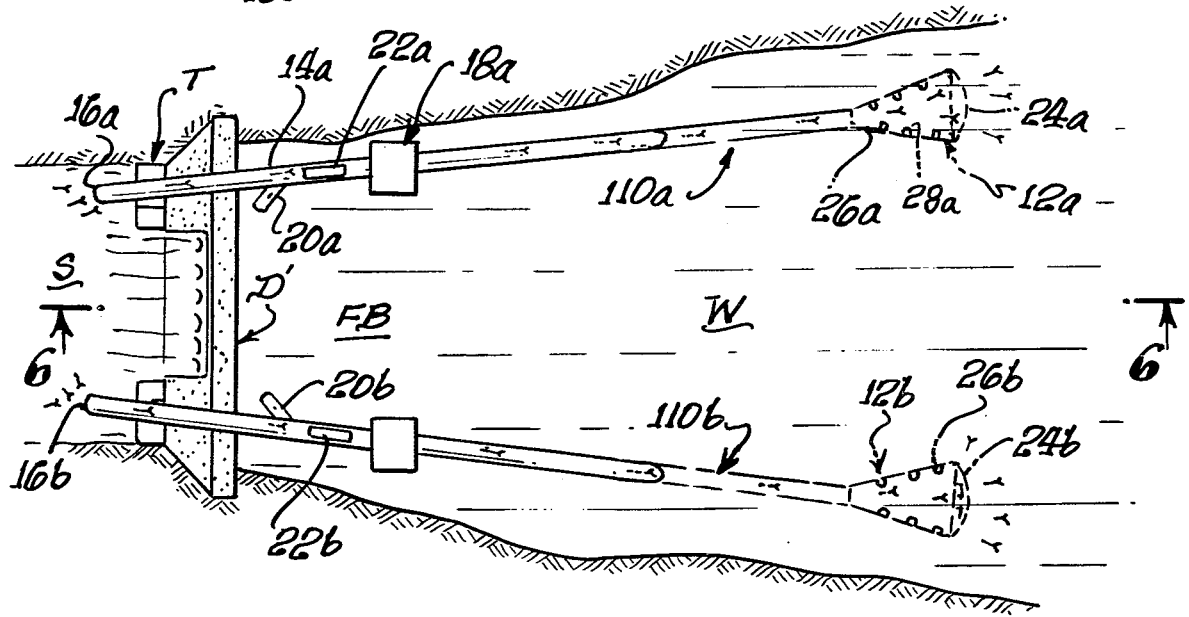
FIG. 5 is a plan view similar to FIG. 2 showing the device of FIG. 4.
Figure 6:
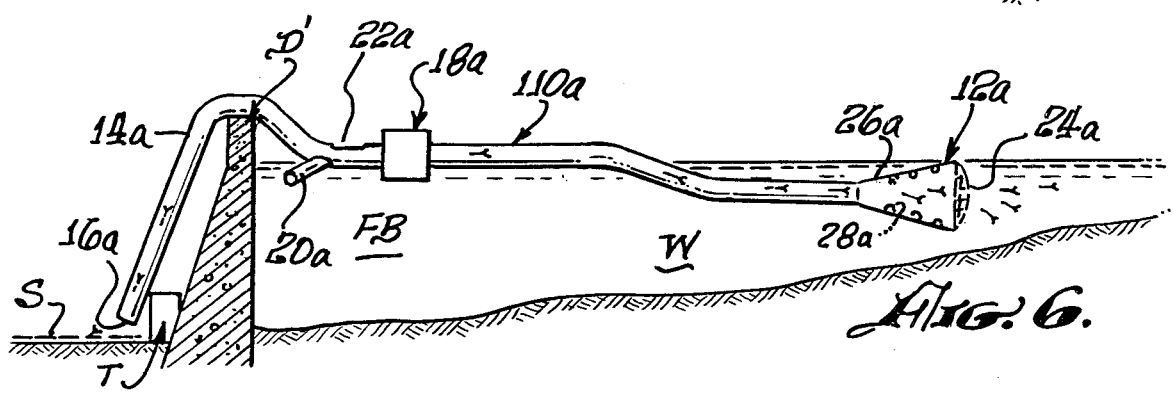
FIG. 6 is a sectional view similar to FIG. 3 and indicating the device of FIGS. 4 and 5.

The illustration of FIG. 1 shows a simplified showing of a hydroelectric facility water storage dam D, as is commonly built along rivers, holding back a body of water W. The forebay portion FB is being illustrated as the area of the body of water W just immediately behind the dam D and the conventional spillway S which accommodates the flow of water being released in excess of hydroelectric purposes. The turbines for generating hydroelectric power are located at T in a well known manner of construction.

The downstream fish transporting system, which is the subject of this invention, comprises one or more conduit systems or open channels above the conduit collecting system in the reservoir for transporting downstream migrating fish past the hydroelectric generating facilities of most conventional dams. The conduit systems are indicated by the reference numerals 10a and 10b.

Trash diversion units 12a and 12b are provided at one end of the conduit systems 10a and 10b at locations in the body of water W which are in the vicinity ordinarily patronized by the downstream migrating fish. FIG. 1 also shows a fish ladder FL on one side.

The conduits 14a and 14b, as indicated in FIG. 1, bypass the dam structure D and lead down an exit at points 16a and 16b into the tailrace area or areas further downstream from the dam emplacement. High volume fish pumps 18a and 18b are placed at locations between the entrance areas 12a and 12b and the dam D to create velocity currents and to move the fish along through the artificially created stream within conduits 10a and 10b.

Once the movement of the fish has been established, it is desirable to divert the majority of the water within the conduit or open channel into being released a points 20a and 20b in the immediate forebay region of the body of water W. The amount of water necessary to continue the movement of fish to the exit points 16a and 16b is cut down dramatically as much as 90-95% thereby allowing the majority of the water passing through the conduits 10a and 10b to be retained for power production release through the hydroelectric facilities.

I have found that predators can be withdrawn from passage through the conduits along with the downstream migrating fish by netting these predators at points 22a and 22b. The larger predators can also be kept from entering and following the downstream fish by diversion means 24a and 24b. These can be in the form of screens or closely spaced bars to keep debris and other floating matter from entering the conduit systems.

The beginning portions of the conduit systems 10a and 10b, as shown at 26a and 26b, are preferably constructed from a light transmitting material such as plastic, or the like. This tranparency allows illumination to remain constant or in the water surrounding the entrances of the conduit systems and keeps the fish from fearing entrance into the conduit systems because of the appearance of a dark channel in which to swim. I have found that just portions of the conduit systems 10a and 10b have to be provided with this material.

The entrance areas 12a and 12b are further enhanced for attracting downstream migrating fish by means of the placement of water jet elements 28a and 28b. These help to simulate a flowing current which makes the fish feel as though they are progressing in a proper direction. The downstream current established by the water jets and a high volume fish pump creates the flow necessary in the top 10-15 meters of water in the reservoir and littoral areas on both sides of the reservoir. The juvenile anadromous fish thus continue their downstream migration to the ocean because of the influence of these artificial currents. The placement of these entrances into the conduit systems is best placed a ways upstream in the body of water W rather than in the vicinity of the immediate forebay FB where currents created by the spillway and turbine mechanisms would then tend to pull the fish down through the apparatus and damage them unnecessarily. The turbines T thus do not have to accommodate or be constructed to have to deal with the downstream migration of the juvenile anadromous fish.

In FIG. 4 I have shown that the conduit units 110a and 110b can be passed directly over the dam D'. This construction is especially suitable when the side walls of the canyons on each side of the dam do not effectively lend toward the bypass system as shown in FIG. 1. The high volume fish pumps known to the present art can easily adapt the methods of my invention to this alternate embodiment.

The construction set forth allows the movement of juvenile anadromous fish in an orderly manner and prevents the delays of migration, mortalities in passing through turbines and the predation in zones both upstream and downstream of such dam facilities. It is to be understood that the placement of the entrance areas 12a and 12b can be such as to accommodate the varying depths of water behind the dam facility.

The placement of the entrance areas 12a and 12b can be regulated by means of pilings straddling the conduit units 10a and 10b or 110a and 110b allowing the entrance areas to always be within the water at a predetermined depth.

It is also to be understood that the amount of water necessary to pass the fish over the dam can be regulated to the amounts necessary to prevent damage to the migrating fish.

The flow splitter can be placed at various locations along the length of each conduit system to suit the purposes of the water retaining facility.

While the embodiments of this invention shown and described are fully capable of achieving the objects and advantages desired, it is to be understood that such embodiments have been for the purposes of illustration only and not for the purpose of limitations.

I claim:

1. A method for transporting downstream migrating fish past hydroelectric generating facilities comprising: creating, at least partially by means of water jets, an artificial stream current means in a portion of the reservoir of a hydroelectric facility water storage dam and in the path of said fish; directing the downwardly migrating fish in such a manner that they sense the artificial stream current means, are attracted to it, and enter it; diverting the artificial stream current means into a water transporting means, which means bypasses the dam and terminates below the dam tailrace into the stream below the generating facility allowing said fish to exit said transporting means.

2. The method set forth in claim 1 wherein artificial stream current means comprises a conduit and water jet array in said reservoir and having a high volume fish pump means in the water transporting means.

3. The method of claim 2 wherein the conduit is of a large size where the artificial stream current means and fish enter it and tapers to a smaller size for bypassing the generating facility.

4. The method of claim 3 wherein the tapering of the conduit is such that it creates an increased velocity beyond the illuminated portion such that fish within the stream at that position cannot turn and fight the current.

5. The method of claim 4 wherein diversions are placed adjacent the opening of said conduit in such a manner as to fend off floating debris within the water.

6. The method of claim 2 wherein the conduit at its largest end where the artificial stream current means and fish enter the conduit is illuminated in its interior.

7. The method of claim 6 wherein the illumination is from the exterior of the conduit and the conduit at that position is of a material which transmits light to its interior.

8. The method of claim 2 wherein a portion of said artificial stream current means is released from said conduit back into a forebay of said storage dam and the remainder of said artificial stream current means bypasses said storage dam and terminates below the dam tailrace.

9. The method of claim 2 wherein said conduit passes over said dam and terminates below the dam tailrace.

10. The method as set forth in claim 1 wherein said water transporting means terminates into a fish ladder means below the generating facility.

11. An apparatus for transporting downstream migrating fish past hydroelectric generating facilities comprising; an artificial stream current creating means including conduit means and water jets located in the reservoir of a hydroelectric facility water storage dam; a water transporting means extending over or around said generating facilities; means for directing and attracting downwardly migrating fish into said conduit means; diverting means for diverting said artificial stream into said conduit means; said water transporting means bypassing said dam to a terminating point at the tailrace located in the stream below said generating facility.

12. The apparatus as set forth in claim 11 wherein said conduit means is of a large size where said artificial stream and said fish enter it and said conduit tapers to a smaller size for bypassing said generating facility.

13. The apparatus of claim 12 wherein said conduit at its larger end is illuminated in its interior.

14. The apparatus of claim 13 wherein the illumination is from the exterior of the conduit means and the conduit means at that position is of a material which transmits light to its interior.

15. The apparatus of claim 14 wherein the tapering of said conduit means is such that it creates an increased velocity beyond the illuminated portion such that fish within the stream at that position cannot turn and fight the current.

16. The apparatus of claim 15 wherein diversion means is placed adjacent the opening of said conduit means in such a manner as to fend off floating debris within the water.

17. The apparatus of claim 11 wherein a high volume fish pump means is placed between the entrance of water into said water transporting means and the terminating point at said tailrace of said water transporting means.

18. The apparatus of claim 17 wherein a predator trapping means is placed in said water transporting means between said high volume fish pump means and said tailrace.

19. An apparatus as set forth in claim 11 wherein said conduit means passes over said hydroelectric facility water storage dam down to a terminating point at said tailrace.

20. An apparatus as set forth in claim 19 wherein said conduit means is provided with water release means at a point before said conduit means passes over or by said dam, releasing water from said conduit means prior to its passing over said dam into said tailrace.

* * * * *